(12) United States Patent
Baldwin

(10) Patent No.: US 7,748,286 B2
(45) Date of Patent: Jul. 6, 2010

(54) DUAL CLUTCH TRANSMISSION HAVING REDUCED AXIAL LENGTH

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 11/695,671

(22) Filed: Apr. 3, 2007

(65) Prior Publication Data

US 2008/0245166 A1    Oct. 9, 2008

(51) Int. Cl.
*F16H 3/08* (2006.01)
(52) U.S. Cl. .......................................... 74/330; 74/331
(58) Field of Classification Search .................... 74/330, 74/331
See application file for complete search history.

(56) References Cited

U.S. PATENT DOCUMENTS

| | | | | |
|---|---|---|---|---|
| 2,612,787 | A | * | 10/1952 | Youngren et al. ............. 74/330 |
| 2,864,479 | A | * | 12/1958 | Schindler ............... 192/85 AA |
| 4,738,149 | A | * | 4/1988 | Janiszewski ................. 74/330 |
| 5,603,242 | A | * | 2/1997 | Krieger ........................ 74/335 |
| 6,209,406 | B1 | * | 4/2001 | Sperber et al. ................ 74/330 |
| 7,044,014 | B2 | | 5/2006 | Janson et al. |
| 7,077,025 | B2 | | 7/2006 | Janson et al. |

OTHER PUBLICATIONS

Pascal Thery, "The Power Transfer DCT", 5th International CTI Symposium, December 4-7, 2006, Berlin, Germany.

* cited by examiner

*Primary Examiner*—Tisha D Lewis
(74) *Attorney, Agent, or Firm*—David B. Kelley

(57) ABSTRACT

A multiple speed power transmission comprises: an input; an output; first and second input shafts releasably coupled to the input by first and second friction clutches, respectively; a countershaft disposed parallel to the first and second input shafts; an output pinion fixed to the countershaft; an output ring gear fixed to the output and meshing with the output pinion; an intermediate shaft disposed coaxially with the countershaft; a first input pinion fixed to the first input shaft and meshing with a first gear fixed to the intermediate shaft; a second input pinion fixed to the second input shaft; a second gear disposed coaxially with the intermediate shaft; an idler gear meshing with the second input pinion and the second gear; a first coupler for releasably coupling the first countershaft to the intermediate shaft; and a second coupler for releasably coupling the intermediate shaft to the second gear.

21 Claims, 9 Drawing Sheets

| Gear Number | Description | Number of teeth |
|---|---|---|
| 26 | $1^{st}$ pinion | 15 |
| 28 | $2^{nd}$ pinion | 19 |
| 30 | $3^{rd}$ / $5^{th}$ pinion | 29 |
| 32 | $4^{th}$ / $6^{th}$ pinion | 38 |
| 34 | $1^{st}$ gear | 64 |
| 36 | $2^{nd}$ gear | 45 |
| 38 | $3^{rd}$ gear | 42 |
| 40 | $4^{th}$ gear | 41 |
| 42 | Reverse gear | 28 |
| 44 | $5^{th}$ gear | 42 |
| 46 | $6^{th}$ gear | 41 |
| 48 | Idler gear | 13 |
| 50 | $1^{st}$ output pinion | 38 |
| 52 | $2^{nd}$ output pinion | 21 |
| 54 | Output ring gear | 94 |

Fig. 2

| Gear | Sleeve 70 | Sleeve 72 | Sleeve 74 | Sleeve 76 | Clutch | Speed Ratio | Step Size |
|---|---|---|---|---|---|---|---|
| Alt1 |  | 58 |  | 66 | 22 | 14.230 | 1.342 to 2nd |
| 1st | 56 |  |  |  | 22 | 19.098 |  |
|  |  |  |  |  |  |  | 1.801 |
| 2nd |  | 58 |  |  | 24 | 10.602 |  |
|  |  |  |  |  |  |  | 1.635 |
| 3rd | 60 |  |  |  | 22 | 6.483 |  |
|  |  |  |  |  |  |  | 1.342 |
| 4th |  | 62 |  |  | 24 | 4.830 |  |
|  |  |  |  |  |  |  | 1.348 |
| 5th |  |  | 64 |  | 22 | 3.583 |  |
|  |  |  |  |  |  |  | 1.342 |
| 6th |  |  | 64 | 66 | 24 | 2.669 |  |
| Rev | 56 |  |  | 68 | 24 | 19.433 | 102% of 1st |
| AltR |  | 58 |  | 68 | 22 | 10.419 | 98% of 2nd |

Fig. 3

| Gear Number | Description | Number of teeth |
|---|---|---|
| 26 | 1st pinion | 15 |
| 28 | 2nd pinion | 23 |
| 78 | 3rd pinion | 31 |
| 30 | 5th pinion | 37 |
| 32 | 4th / 6th pinion | 42 |
| 34 | 1st gear | 68 |
| 36 | 2nd gear / idler | 63 |
| 38 | 3rd gear | 53 |
| 40 | 4th gear | 48 |
| 42 | Reverse gear | 31 |
| 44 | 5th gear | 49 |
| 46 | 6th gear | 43 |
| 50 | 1st output pinion | 36 |
| 52 | 2nd output pinion | 22 |
| 54 | Output ring gear | 93 |

Fig. 5

| Gear | Sleeve 70 | Sleeve 72 | Sleeve 74 | Sleeve 76 | Clutch | Speed Ratio | Step Size |
|---|---|---|---|---|---|---|---|
| Alt1 |  | 58 |  | 66 | 22 | 14.978 | 1.294 to 2nd |
| 1st | 56 |  |  |  | 22 | 19.164 |  |
|  |  |  |  |  |  |  | 1.655 |
| 2nd |  | 58 |  |  | 24 | 11.579 |  |
|  |  |  |  |  |  |  | 1.602 |
| 3rd | 60 |  |  |  | 22 | 7.227 |  |
|  |  |  |  |  |  |  | 1.496 |
| 4th |  | 62 |  |  | 24 | 4.831 |  |
|  |  |  |  |  |  |  | 1.412 |
| 5th |  |  | 64 |  | 22 | 3.421 |  |
|  |  |  |  |  |  |  | 1.294 |
| 6th |  |  | 64 | 66 | 24 | 2.645 |  |
| Rev | 56 |  |  | 68 | 24 | 19.504 | 102% of 1st |
| AltR |  | 58 |  | 68 | 22 | 11.377 | 98% of 2nd |

Fig. 6

| Gear Number | Description | Number of teeth |
|---|---|---|
| 26 | 1st pinion | 15 |
| 28 | 2nd pinion | 22 |
| 30 | 3rd / 5th pinion | 35 |
| 32 | 4th / 6th pinion | 49 |
| 80 | 7th pinion | 85 |
| 34 | 1st gear | 58 |
| 36 | 2nd gear | 47 |
| 38 | 3rd gear | 48 |
| 40 | 4th gear | 51 |
| 42 | Reverse gear | 27 |
| 44 | 5th gear | 48 |
| 46 | 6th gear | 51 |
| 82 | 7th gear | 71 |
| 48 | Idler gear | 15 |
| 50 | 1st output pinion | 28 |
| 52 | 2nd output pinion | 16 |
| 54 | Output ring gear | 87 |

Fig. 8

| Gear | Sleeve 70 | Sleeve 72 | Sleeve 74 | Sleeve 76 | Clutch | Speed Ratio | Step Size |
|---|---|---|---|---|---|---|---|
| Alt1 |  | 58 |  | 66 | 22 | 15.306 | 1.318 to 2nd |
| 1st | 56 |  |  |  | 22 | 21.025 |  |
|  |  |  |  |  |  |  | 1.810 |
| 2nd |  | 58 |  |  | 24 | 11.616 |  |
|  |  |  |  |  |  |  | 1.558 |
| 3rd | 60 |  |  |  | 22 | 7.457 |  |
|  |  |  |  |  |  |  | 1.318 |
| 4th |  | 62 |  |  | 24 | 5.659 |  |
|  |  |  |  |  |  |  | 1.328 |
| 5th |  |  | 64 |  | 22 | 4.261 |  |
|  |  |  |  |  |  |  | 1.318 |
| 6th |  |  | 64 | 66 | 24 | 3.234 |  |
|  |  |  |  |  |  |  | 1.246 |
| 7th |  |  | 84 |  | 22 | 2.595 |  |
|  |  |  |  |  |  |  | 1.318 |
| 8th |  |  | 84 | 66 | 24 | 1.970 |  |
| Rev | 56 |  |  | 68 | 24 | 18.815 | 89% of 1st |
| AltR |  | 58 |  | 68 | 22 | 15.306 | 112% of 2nd |

Fig. 9

DUAL CLUTCH TRANSMISSION HAVING REDUCED AXIAL LENGTH

BACKGROUND OF THE INVENTION

This invention relates to automatic transmissions having a layshaft kinematic arrangement, particularly to automatic transmissions having dual input clutches, but no torque converter.

Dual clutch layshaft transmissions are essentially two automated manual transmissions in a common housing, one providing odd numbered gears and the other providing even numbered gears. Shifts between odd and even numbered gears can be accomplished without interrupting power flow. While operating in an odd numbered gear, couplers can be actuated to configure the transmission for the desired even numbered gear. Then, power is transferred to the even numbered gear by engaging the even clutch while disengaging the odd clutch in a coordinated fashion.

In a front wheel drive vehicle, the axial space available for the transmission is limited by the width of the engine compartment and the length of the engine. For this reason, dual clutch transmissions typically use at least two countershafts so that components can be placed side by side instead of along the main transmission axis. Some arrangements, such as those described in U.S. Pat. Nos. 7,044,014 and 7,077,025, utilize more than two countershafts to achieve very short lengths.

A well known method of reducing the length of a two countershaft transmission is having a single pinion on an input shaft drive gears on both countershafts. This reduces the overall length of the transmission by the face width of a gear. A disadvantage of this method is that it reduces the ability to adjust speed ratios by selecting the size of each gear, because a change in the size of the pinion forces a change in the size of both driven gears. This disadvantage is partially alleviated by the fact that there are two final drive ratios which can be adjusted separately to achieve the desired ratio spacing. However, when more than one input pinion is re-used for two gears, the number of degrees of freedom for adjusting ratios is less than the number of ratios. As a result, a designer is forced to accept some ratios that are larger or smaller than desired.

It is desirable to have the speed ratio for reverse be about the same as the speed ratio for first gear, since both are used to move the vehicle from rest. However, in a typical layshaft transmission, it is difficult to obtain a reverse speed ratio this high with a single idler gear. The size of the pinion is limited and the size of the driven gear cannot be as large as the driven gear for first because the teeth must clear the teeth on the pinion. As a result, a stepped pinion is sometimes used to provide an additional opportunity to multiply the torque. However, stepped pinions increase the required axial length.

BRIEF SUMMARY OF THE INVENTION

The claimed invention is a dual clutch transmission which is intended for applications which have limited axial space available. The transmission has two countershafts, each with a final drive pinion that meshes with a common final drive ring gear. The gears on one of the countershafts (fifth, sixth, and reverse) are arranged as a cluster in a way that creates a direction reversing power path between the two input shafts. Reverse is obtained via the even clutch, the direction reversing power path to the odd input shaft, and the first gear power path. The overall length is reduced by using re-using pinions for multiple ratios and by moving the gearing associated with reverse to a location that does not increase axial length.

An additional power path between the input shafts is available using the gearing for fifth gear and sixth gear. This power path, in combination with the second gear power path, creates an alternative first gear which is a small step shorter than second gear. An alternative reverse is also available by using the odd gear clutch, the direction reversing power path to the even gear input shaft, and the second gear power path.

One aspect of the present invention is a multiple speed power transmission comprising an input; an output; first and second input shafts releasably coupled to the input by first and second friction clutches, respectively; a countershaft disposed parallel to the first and second input shafts; an output pinion fixed to the countershaft; an output ring gear fixed to the output and meshing with the output pinion; an intermediate shaft disposed coaxially with the countershaft; a first input pinion fixed to the first input shaft and meshing with a first gear fixed to the intermediate shaft; a second input pinion fixed to the second input shaft; a second gear disposed coaxially with the intermediate shaft; an idler gear meshing with the second input pinion and the second gear; a first coupler for releasably coupling the first countershaft to the intermediate shaft; and a second coupler for releasably coupling the intermediate shaft to the second gear.

BRIEF DESCRIPTION OF THE DRAWINGS

FIG. 2 is a table showing the proposed tooth numbers for the gears and pinions of the transmission illustrated in FIG. 1.

FIG. 3 is a table indicating the positions of the sleeves and state of the clutches and resulting speed ratio of the transmission in FIG. 1 when the gears and pinions have the numbers of teeth indicated in FIG. 2.

FIG. 5 is a table showing the proposed tooth numbers for the gears and pinions of the transmission illustrated in FIG. 4.

FIG. 6 is a table indicating the positions of the sleeves and state of the clutches and resulting speed ratio of the transmission in FIG. 4 when the gears and pinions have the numbers of teeth indicated in FIG. 5.

FIG. 8 is a table showing the proposed tooth numbers for the gears and pinions of the transmission illustrated in FIG. 7.

FIG. 9 is a table indicating the positions of the sleeves and state of the clutches and resulting speed ratio of the transmission in FIG. 7 when the gears and pinions have the numbers of teeth indicated in FIG. 8.

DETAILED DESCRIPTION OF THE INVENTION

Figure 1:
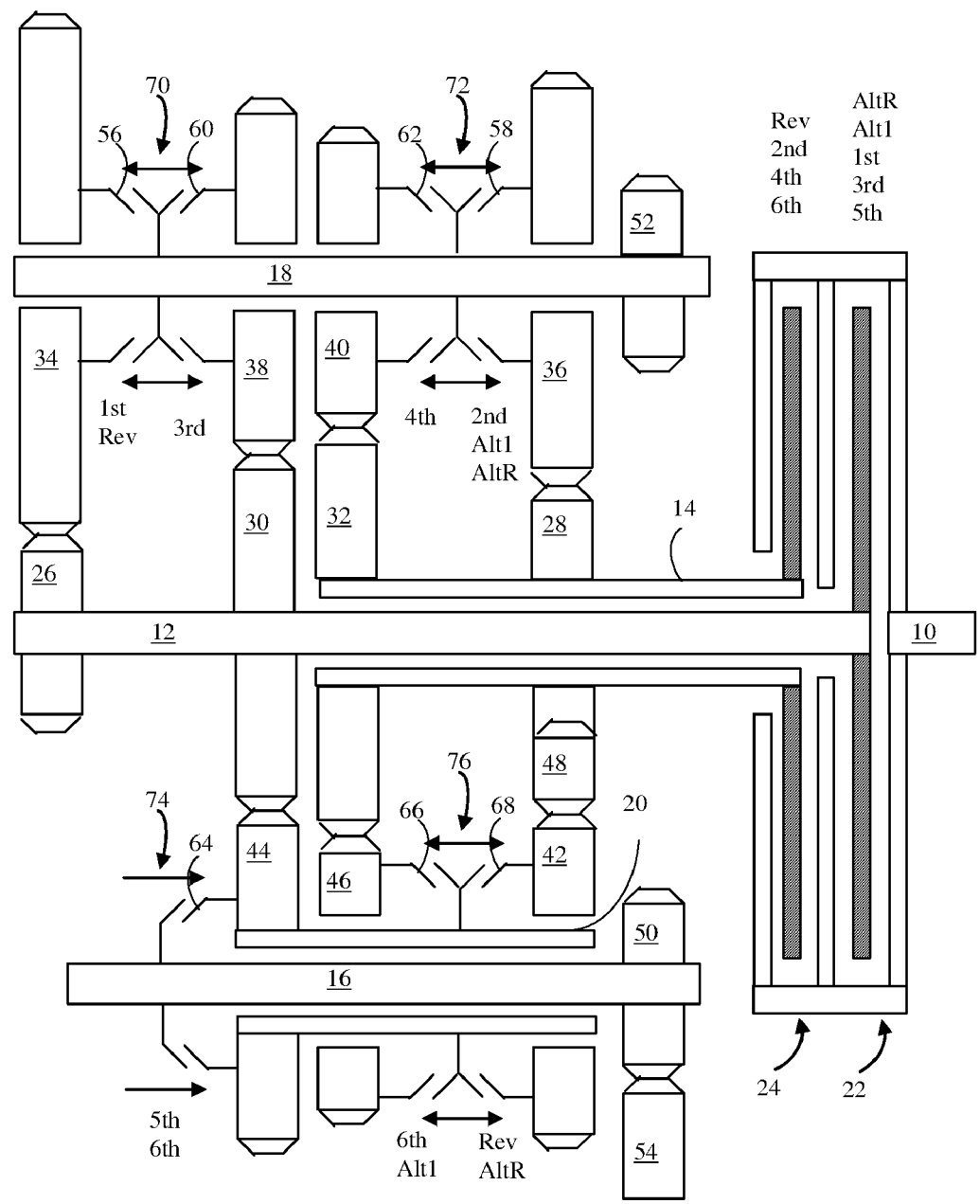
FIG. 1 is a schematic diagram of a dual clutch transmission according to an embodiment of the present invention which produces seven forward and two reverse speed ratios.

A transmission according to a first embodiment of the present invention is illustrated in FIG. 1. A transmission input 10 is driven by the vehicle's engine. An odd clutch 22 releasably couples the transmission input to a solid input shaft 12. An even clutch 24 releasably couples the transmission input to a hollow input shaft 14 which is concentric with the solid input shaft. Countershafts 16 and 18 are arranged parallel to the input shafts. Output pinions 50 and 52 are fixed to the countershafts and mesh with output ring gear 54. The output ring gear is fixed to the carrier of the differential unit (not shown) which drives both half shafts and the front wheels of the vehicle.

Pinions 26 and 30 are fixed to solid input shaft 12. Pinions 28 and 32 are fixed to hollow input shaft 14. Gear 34 is supported for rotation on countershaft 18 and in continuous meshing engagement with pinion 26. Gear 38 is supported for rotation on countershaft 18 and in continuous meshing engagement with pinion 30. Gear 40 is supported for rotation on countershaft 18 and in continuous meshing engagement with pinion 32. Gear 36 is supported for rotation on countershaft 18 and in continuous meshing engagement with pinion 28. Hollow intermediate shaft 20 is supported for rotation on countershaft 16. Gear 44 is fixed to intermediate shaft 20 and in continuous meshing engagement with pinion 30. Gear 46 is supported for rotation on intermediate shaft 20 and in continuous meshing engagement with pinion 32. Gear 42 is supported for rotation on intermediate shaft 20. Idler gear 48 is in continuous meshing engagement with both pinion 28 and gear 42.

Gears which are supported for rotation on a shaft are selectively connected to and disconnected from the shaft by a coupler. These couplers are preferably synchronizers as used in manual transmissions which first match the speeds of the elements and then engage dog teeth. The couplers are actuated by moving a sleeve. Coupler 56 engages gear 34 with countershaft 18 whenever sleeve 70 is moved to the left. Coupler 60 engages gear 38 with countershaft 18 whenever sleeve 70 is moved to the right. Coupler 62 engages gear 40 with countershaft 18 whenever sleeve 72 is moved to the left. Coupler 58 engages gear 36 with countershaft 18 whenever sleeve 72 is moved to the right. Coupler 64 engages gear 44 and intermediate shaft 20 with countershaft 16 whenever sleeve 74 is moved to the right. Coupler 66 engages gear 46 with intermediate shaft 20 whenever sleeve 76 is moved to the left. Coupler 68 engages gear 42 with intermediate shaft 20 whenever sleeve 76 is moved to the right. Moving a sleeve to an intermediate position disengages both couplers with which it is associated.

The transmission is prepared to start the vehicle from stationary in the forward direction by moving sleeve 70 to the left to couple gear 34 to countershaft 18 and moving sleeve 72 to the right to couple gear 36 to countershaft 18. Other sleeves must be in the neutral position. Then, clutch 22 is gradually engaged. Power flows from the transmission input through clutch 22 to input shaft 12, pinion 26, gear 34, coupler 56, countershaft 18, output pinion 52, and output ring gear 54. When the gears and pinions have the number of teeth shown in FIG. 2, the ratio of transmission input speed to front wheel speed will be 19.098.

When sufficient vehicle speed has been achieved, the transmission is shifted into second gear by progressively releasing clutch 22 while progressively engaging clutch 24. Power flows from the transmission input through clutch 24 to input shaft 14, pinion 28, gear 36, coupler 58, countershaft 18, output pinion 52, and output ring gear 54. When the gears and pinions have the number of teeth shown in FIG. 2, the overall speed ratio will be 10.602 at the completion of the this shift.

The transmission is prepared for the shift into third gear by moving sleeve 70 to the right, thus disengaging gear 34 from countershaft 18 and coupling gear 38 to countershaft 18. This action may be performed at any time after the shift into second is completed. The shift is completed by progressively releasing clutch 24 while progressively engaging clutch 22. Power flows from the transmission input through clutch 22 to input shaft 12, pinion 30, gear 38, coupler 60, countershaft 18, output pinion 52, and output ring gear 54. When the gears and pinions have the number of teeth shown in FIG. 2, the overall speed ratio will be 6.483 at the completion of the this shift.

The transmission is prepared for the shift into fourth gear by moving sleeve 72 to the left, thus disengaging gear 36 from countershaft 18 and coupling gear 40 to countershaft 18. This action may be performed at any time after the shift into third is completed. The shift is completed by progressively releasing clutch 22 while progressively engaging clutch 24. Power flows from the transmission input through clutch 24 to input shaft 14, pinion 32, gear 40, coupler 62, countershaft 18, output pinion 52, and output ring gear 54. When the gears and pinions have the number of teeth shown in FIG. 2, the overall speed ratio will be 4.830 at the completion of the this shift.

The transmission is prepared for the shift into fifth gear by moving sleeve 70 to an intermediate position, thus disengaging gear 38 from countershaft 18 and moving sleeve 74 to the right, thus coupling gear 44 to countershaft 16. This action may be performed at any time after the shift into fourth is completed. The shift is completed by progressively releasing clutch 24 while progressively engaging clutch 22. Power flows from the transmission input through clutch 22 to input shaft 12, pinion 30, gear 44, coupler 64, countershaft 16, output pinion 50, and output ring gear 54. When the gears and pinions have the number of teeth shown in FIG. 2, the overall speed ratio will be 3.583 at the completion of the this shift.

The transmission is prepared for the shift into sixth gear by moving sleeve 72 to an intermediate position, thus disengaging gear 40 from countershaft 18 and moving sleeve 76 to the left, thus coupling gear 46 to intermediate shaft 20. This action may be performed at any time after the shift into fifth is completed. The shift is completed by progressively releasing clutch 22 while progressively engaging clutch 24. When the gears and pinions have the number of teeth shown in FIG. 2, the overall speed ratio will be 2.669 at the completion of the this shift. In sixth gear, power flows from the transmission input, through clutch 24 to input shaft 14, pinion 32, gear 46, coupler 66, intermediate shaft 20, coupler 64, countershaft 16, output pinion 50, and output ring gear 54. Sleeve 74 must remain in the right position while the transmission is operated in sixth gear.

An alternative first gear ratio is available which provides a smaller speed ratio and a smaller ratio step to second gear. This ratio would be preferable in situations in which the vehicle is lightly loaded because the smaller ratio step enables a more comfortable shift into second gear and the high speed ratio of the regular first gear would not be necessary. The transmission is prepared to start the vehicle from stationary using this alternate first gear by moving sleeve 76 to the left to couple gear 46 to intermediate shaft 20 and moving sleeve 72 to the right to couple gear 36 to countershaft 18. Other sleeves must be in the neutral position. Then, clutch 22 is gradually engaged. Power flows from the transmission input through clutch 22 to input shaft 12, pinion 30, gear 44, intermediate shaft 20, coupler 66, gear 46, pinion 32, input shaft 14, pinion 28, gear 36, coupler 58, countershaft 18, output pinion 52, and output ring gear 54. When the gears and pinions have the number of teeth shown in FIG. 2, the ratio of transmission input speed to front wheel speed will be 14.230. The shift from this alternate first gear ratio to the second forward ratio is accomplished by progressively releasing clutch 22 while progressively engaging clutch 24. Sleeve 76 must be moved to its intermediate position between the completion of the shift into second and preparing the transmission for a shift into third. Operation in higher gears is as described above.

The transmission is prepared to start the vehicle from stationary in the reverse direction by moving sleeve 70 to the left to couple gear 34 to countershaft 18 and moving sleeve 76 to the right to couple gear 42 to intermediate shaft 20. Other sleeves must be in the neutral position. Then, clutch 24 is gradually engaged. Power flows from the transmission input through clutch 24 to input shaft 14, pinion 28, idler gear 48, gear 42, coupler 68, intermediate shaft 20, gear 44, pinion 30, input shaft 12, pinion 26, gear 34, coupler 56, countershaft 18, output pinion 52, and output ring gear 54. When the gears and pinions have the number of teeth shown in FIG. 2, the ratio of transmission input speed to front wheel speed will be 19.433.

An alternative reverse gear ratio is available. The transmission is prepared to start the vehicle from stationary using this alternate reverse gear by moving sleeve 76 to the right to couple gear 42 to intermediate shaft 20 and moving sleeve 72 to the right to couple gear 36 to countershaft 18. Other sleeves must be in the neutral position. Then, clutch 22 is gradually engaged. Power flows from the transmission input through clutch 22 to input shaft 12, pinion 30, gear 44, intermediate shaft 20, coupler 68, gear 42, idler gear 48, pinion 28, gear 36, coupler 58, countershaft 18, output pinion 52, and output ring gear 54. When the gears and pinions have the number of teeth shown in FIG. 2, the ratio of transmission input speed to front wheel speed will be 10.419.

In applications that do not require wide ratio span, pinion 26, gear 34, and coupler 56 could be eliminated, producing an even shorter embodiment. The alternate first gear ratio would be used in place of regular first gear and the alternate reverse gear ratio would be used in place of regular reverse gear. The number of teeth on gear 42 could be adjusted to obtain a more favorable reverse speed ratio.

Figure 4:
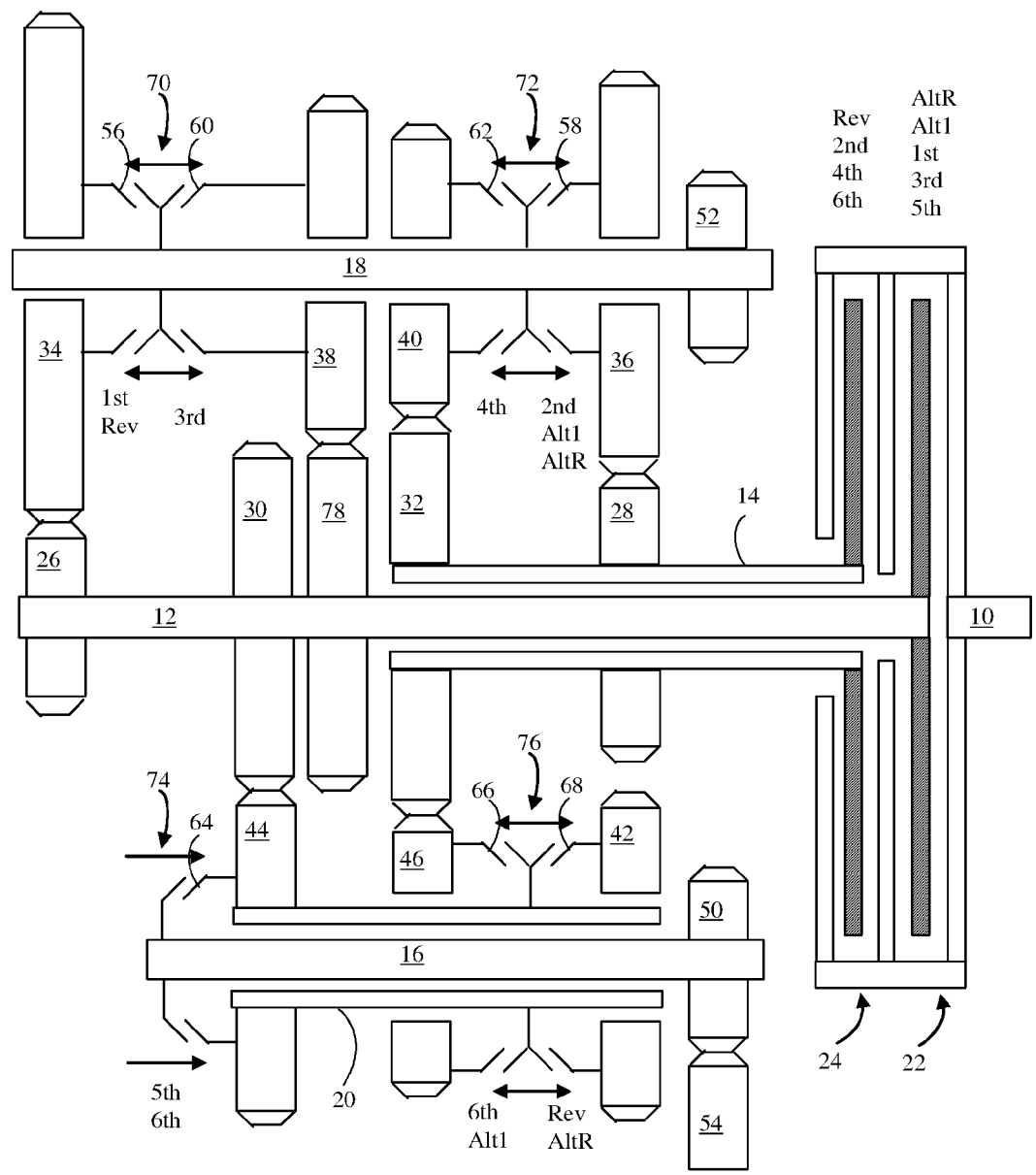
FIG. 4 is a schematic diagram of a dual clutch transmission according to a second embodiment of the present invention which produces seven forward and two reverse speed ratios.

FIG. 4 illustrates an alternate embodiment of the invention. One difference between this embodiment and the embodiment illustrated in FIG. 1 is the addition of pinion 78, which is fixed to input shaft 12 and meshes with gear 38. This removes the ratio redundancy between third and fifth gears and enables a more favorable set of ratio steps. This change will increase the overall length unless sleeve 70 is narrow enough to fit beside pinion 30 and gear 44. A second difference is that reverse idler 48 has been eliminated and gear 42 now meshes with gear 36, such that gear 36 accomplishes the role of a reverse idler gear. This decreases the cost but also decreases the freedom to select the reverse gear ratio by adjusting tooth counts. These two variations could be practiced independently of one another. The operation of the embodiment of FIG. 4 is similar to the operation of the embodiment of FIG. 1 which is described above.

Figure 7:
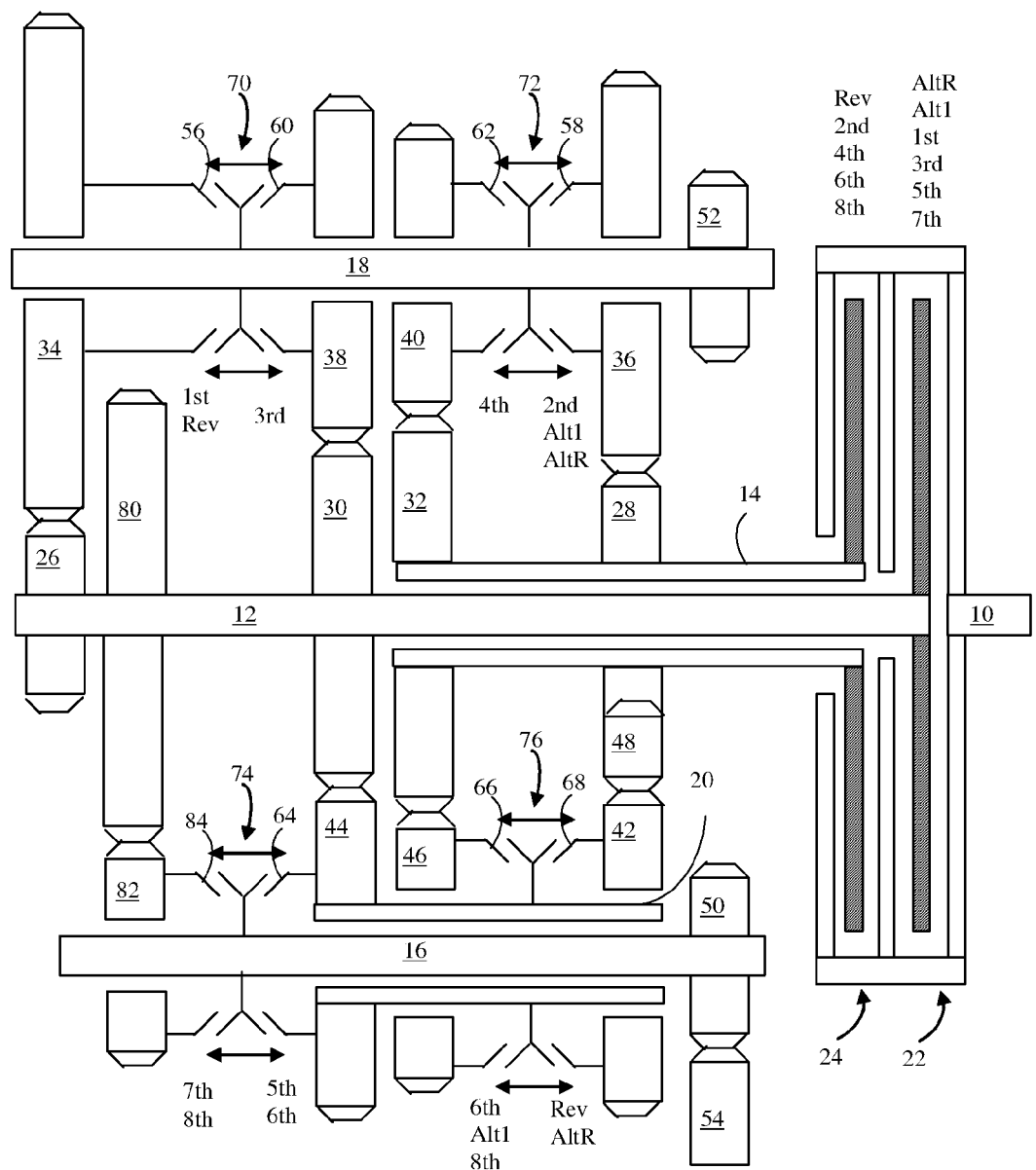
FIG. 7 is a schematic diagram of a dual clutch transmission according to a third embodiment of the present invention which produces nine forward and two reverse speed ratios.

FIG. 7 illustrates a third embodiment that obtains two additional forward speed ratios. It is derived from the embodiment illustrated in FIG. 1 by adding pinion 80 fixed to input shaft 12, gear 82 supported for rotation on countershaft 16, and coupler 84 which engages gear 82 with countershaft 16 whenever sleeve 74 is moved to the left. These parts could be added to the embodiment of FIG. 4 with similar results.

The transmission of FIG. 7 operates in a similar manner to the transmission of FIG. 1 up through sixth gear. The shift from sixth gear to seventh gear is accomplished by releasing clutch 24, moving sleeve 74 to the left to disengage gear 44 from countershaft 16 and engage gear 82 to countershaft 16, and then engaging clutch 22. This shift, unlike the shifts described above, requires the interruption of power to the wheels. Sleeve 76 should be maintained in the left position. A shift from seventh to eighth is accomplished by progressively releasing clutch 22 while progressively engaging clutch 24.

In accordance with the provisions of the patent statutes, three preferred embodiment have been described. However, it should be noted that alternate embodiments can be practiced otherwise than as specifically illustrated and described.

What is claimed is:

1. A multiple speed power transmission, comprising:
   an input (10);
   an output;
   first (12) and second (14) coaxial input shafts;
   first (22) and second (24) friction clutches releasably coupling the input to the first and second input shafts, respectively;
   a first countershaft (16) disposed substantially parallel to the first and second input shafts;
   a first output pinion (50) fixed to the first countershaft;
   an output ring gear (54) fixed to the output and meshing with the first output pinion;
   an intermediate shaft (20) disposed coaxially with the first countershaft;
   a first input pinion (30) fixed to the first input shaft;
   a first gear (44) fixed to the intermediate shaft and meshing with the first input pinion;
   a second input pinion (28) fixed to the second input shaft;
   a second gear (42) disposed coaxially with the intermediate shaft;
   an idler gear (36 or 48) meshing with the second input pinion and the second gear;
   a first coupler (64) for releasably coupling the first countershaft to the intermediate shaft and first gear;
   a second coupler (68) for releasably coupling the intermediate shaft to the second gear;
   a third input pinion (32) fixed to the second input shaft;
   a third gear (46) disposed coaxially with the intermediate shaft and meshing with the third input pinion; and
   a third coupler (66) for releasably coupling the intermediate shaft to the third gear.

2. The multiple speed power transmission of claim 1, further comprising a first sleeve (74) disposed coaxially with the first countershaft, wherein:
   the first coupler (64) is engaged when said first sleeve is moved in one direction; and
   the first coupler is disengaged when said first sleeve is moved in the opposite direction.

3. The multiple speed power transmission of claim 1, further comprising a second sleeve (76) disposed coaxially with the intermediate shaft, wherein:
   the second coupler (68) is disengaged and the third coupler (66) is engaged when said second sleeve is moved in one direction;
   the second coupler is engaged and the third coupler is disengaged when said second sleeve is moved in the opposite direction; and
   the second and third couplers are both disengaged when said second sleeve is moved to an intermediate position.

4. The multiple speed power transmission of claim 1, further comprising:
   a second countershaft (18) disposed substantially parallel to the first and second input shafts;
   a second output pinion (52) fixed to the second countershaft and meshing with the output ring gear;
   a fourth gear (38) disposed coaxially with the second countershaft and driveably connected to the first input shaft (12);
   a fifth gear (40) disposed coaxially with the second countershaft and driveably connected to the second input shaft (14);
   a sixth gear (36) disposed coaxially with the second countershaft and meshing with the second input pinion (28);
   a fourth coupler (60) for releasably coupling the second countershaft to the fourth gear;

a fifth coupler (62) for releasably coupling the second countershaft to the fifth gear; and a sixth coupler (58) for releasably coupling the second countershaft to the sixth gear.

5. The multiple speed power transmission of claim 4, wherein the fourth gear (38) meshes with the first input pinion (30).

6. The multiple speed power transmission of claim 4, further comprising a fourth input pinion (78) fixed to the first input shaft and meshing with the fourth gear (38).

7. The multiple speed power transmission of claim 4, wherein the fifth gear (40) meshes with the third input pinion (32).

8. The multiple speed power transmission of claim 4, further comprising a third sleeve (72) disposed coaxially with the second countershaft, wherein:
- the fifth coupler (62) is disengaged and the sixth coupler (58) is engaged when said third sleeve is moved in one direction;
- the fifth coupler is engaged and the sixth coupler is disengaged when said third sleeve is moved in the opposite direction; and
- the fifth and sixth couplers are both disengaged when said third sleeve is moved to an intermediate position.

9. The multiple speed power transmission of claim 4, further comprising:
- a fifth input pinion (26) fixed to the first input shaft;
- a seventh gear (34) disposed coaxially with the second countershaft and meshing with the fifth input pinion; and
- a seventh coupler (56) for releasably coupling the second countershaft to the seventh gear.

10. The multiple speed power transmission of claim 9, further comprising a fourth sleeve (70) disposed coaxially with the second countershaft, wherein:
- the seventh coupler (56) is disengaged and the fourth coupler (60) is engaged when said fourth sleeve is moved in one direction;
- the seventh coupler is engaged and the fourth coupler is disengaged when said fourth sleeve is moved in the opposite direction; and
- the fourth and seventh couplers are both disengaged when said fourth sleeve is moved to an intermediate position.

11. The multiple speed power transmission of claim 4, further comprising:
- an sixth input pinion (80) fixed to the first input shaft;
- an eighth gear (82) disposed coaxially with the first countershaft and meshing with the sixth input pinion; and
- an eighth coupler (84) for releasably coupling the first countershaft to the eighth gear.

12. The multiple speed power transmission of claim 1, further comprising:
- a second countershaft (18) disposed coaxially with the idler gear (36);
- a second output pinion (52) fixed to the second countershaft and meshing with the output gear; and an alternative of
- a third coupler (58) for releasably coupling the second countershaft to the idler gear.

13. The multiple speed power transmission of claim 12, further comprising:
- a third input pinion (32) fixed to the second input shaft;
- a third gear (46) disposed coaxially with the intermediate shaft and meshing with the third pinion; and
- a fourth coupler (66) for releasably coupling the intermediate shaft to the third gear.

14. The multiple speed power transmission of claim 13, further comprising:
- a fourth gear (38) disposed coaxially with the second countershaft and driveably connected to the first input shaft;
- a fifth gear (40) disposed coaxially with the second countershaft and driveably connected to the second input shaft;
- a fifth coupler (60) for releasably coupling the second countershaft to the fourth gear; and
- a sixth coupler (62) for releasably coupling the second countershaft to the fifth gear.

15. The multiple speed power transmission of claim 14, wherein the fourth gear (38) meshes with the first input pinion (30).

16. The multiple speed power transmission of claim 14, further comprising a fourth input pinion (78) fixed to the first input shaft and meshing with the fourth gear (38).

17. The multiple speed power transmission of claim 14, wherein the fifth gear (40) meshes with the third input pinion (32).

18. The multiple speed power transmission of claim 14, further comprising:
- a fifth input pinion (26) fixed to the first input shaft;
- a sixth gear (34) disposed coaxially with the second countershaft and meshing with the fifth input pinion; and
- a seventh coupler (56) for releasably coupling the second countershaft to the sixth gear.

19. The multiple speed power transmission of claim 14, further comprising:
- a sixth input pinion (80) fixed to the first input shaft;
- a seventh gear (82) disposed coaxially with the first countershaft and meshing with the sixth input pinion; and
- an eighth coupler (84) for releasably coupling the first countershaft to the seventh gear.

20. A multiple speed power transmission, comprising:
- an input (10);
- an output;
- first (12) and second (14) coaxial input shafts;
- first (22) and second (24) friction clutches releasably coupling the input to the first and second input shafts, respectively;
- first (16) and second (18) countershafts disposed substantially parallel to the first and second input shafts and driveably connected to the output; and
- a selectable power path (12, 30, 44, 20, 68, 42, 48, 28, 14) connecting the first and second input shafts, wherein:
- the first and second input shafts rotate in opposite directions; and
- said power path does not include either the first or second countershaft.

21. A multiple speed power transmission, comprising:
- an input (10);
- an output;
- first (12) and second (14) coaxial input shafts;
- first (22) and second (24) friction clutches releasably coupling the input to the first and second input shafts, respectively;
- a first countershaft (16) disposed substantially parallel to the first and second input shafts and driveably connected to the output;
- a first rotating element (44) disposed coaxially with the first countershaft and driveably connected to the first input shaft such that it rotates in the opposite direction of the first input shaft;
- a second rotating element (42) disposed coaxially with the first countershaft and driveably connected to the second input shaft such that it rotates in the same direction as the second input shaft;
- a first coupler (64) for releasably coupling the first countershaft to the first rotating element; and
- a second coupler (68) for releasably coupling the first rotating element to the second rotating element.

* * * * *